United States Patent [19]

Takada

[11] Patent Number: 5,033,787
[45] Date of Patent: Jul. 23, 1991

[54] END PART FIXING DEVICE FOR A VEHICULAR HOOD

[75] Inventor: Yukiya Takada, Shizuoka, Japan

[73] Assignee: Suzuki Motor Company, Ltd., Shizuoka, Japan

[21] Appl. No.: 333,690

[22] Filed: Apr. 4, 1989

[30] Foreign Application Priority Data

May 20, 1988 [JP] Japan .................................. 63-66672

[51] Int. Cl.⁵ .............................................. B60J 7/10
[52] U.S. Cl. .................................... 296/102; 296/121; 160/395
[58] Field of Search ....................... 296/102, 121, 100; 135/119; 160/392, 395

[56] References Cited

U.S. PATENT DOCUMENTS 3,201,171  8/1965  Wickard ............................. 296/100
3,774,959  11/1973  Brudy ................................ 296/121
4,188,764  2/1980  Gode .................................. 160/392
4,807,921  2/1989  Champie, III et al. ............. 296/100

Primary Examiner—Dennis H. Pedder
Attorney, Agent, or Firm—McGlew & Tuttle

[57] ABSTRACT

An end part fixing device for a vehicular hood adapted to be fixed to a main frame at a position corresponding to the end part of the vehicular hood, the end part fixing device including a pair of capturing members of which inner configuration substantially corresponds to the outer configuration of a rod secured to the end part of the vehicular hood to defined a recess between the pair of capturing members so as to allow the end part of the vehicular hood to be fixed to the main frame by engaging the rod with the recess while the pair of capturing members are deformed elastically, wherein a projection member is provided for preventing the rod from being introduced into a hollow space defined between the upper capturing member and a weather strip located in the proximity of the upper capturing member.

2 Claims, 2 Drawing Sheets

END PART FIXING DEVICE FOR A VEHICULAR HOOD

FIELD OF THE INVENTION AND RELATED ART STATEMENT

The present invention relates to an end part fixing device for a vehicular hood and more particularly to an end part fixing device for fixing the end part of a hood on an automotive vehicle of the type having a hood attached thereto.

To facilitate understanding of the present invention, a conventional end part fixing device will be described below with reference to FIGS. 5 to 7.

FIG. 5 is a perspective view illustrating by way of example a motorcar of the type having a hood attached thereto, wherein a conventional end part fixing device is employed for the motorcar.

The motorcar includes a rear hood 1 which is removably fixed to a left side hood 1a, an upper hood 1b and a right side hood 1c using a fastener 2.

As shown in FIGS. 6 and 7, the lower end part of the rear hood 1 is fixed to a main frame 4 using the end part fixing device 3. To this end, a rod 6 is held in a sleeve 5 made of fabric which is secured to the inner surface of the lower end part of the rear hood 1. A part of the sleeve 5 is cut out at 5a so that a part of the rod 6 is exposed to the outside through the cutout 5a.

On the other hand, the end part fixing device 3 is fixed to the main frame 4 in the proximity of a weather strip 7 at a position located below the latter. The end part fixing device 3 includes a pair of capturing members 3a and 3b of which inner configuration substantially corresponds to the outer configuration of the rod 6 to define a recess between the pair of capturing members 3a and 3b. With such construction, the end part of the rear hood 1 can be fixed to the main frame 4 via the end part fixing device 3 by engaging the rod 6 with the recess while the pair of capturing members 3a and 3b are deformed elastically.

As mentioned above, the end part fixing device is fixed to the main frame 4 in the proximity of the weather strip 7 at a position located below the latter. The reason why the end part fixing device 3 is fixed in that way consists in that if a distance between the weather strip 7 and the end part fixing device 3 is determined longer, a function of the weather strip 7 for preventing wind and rain from being introduced into the interior of the vehicle via the end part of the rear hood 1 is degraded. As shown in FIG. 7, a hollow space 8 is produced between the weather strip 7 and the end part fixing device 3, unless the weather strip 7 is fastened to the main frame 4 in the proximity of the end part fixing device 3.

In this case, the rod 6 tends to be erroneously introduced into the hollow space 8 as represented by a dotted line in FIG. 7, when it is displaced toward the recess in the direction as represented by a solid line in the drawing.

OBJECT AND SUMMARY OF THE INVENTION

The present invention has been made with the foregoing background in mind and its object resides in providing an end part fixing device for a vehicular hood which assures that the aforementioned erroneous operation can be prevented reliably.

To accomplish the above object, the present invention provides an end part fixing device for a vehicular hood adapted to be fixed to a main frame at a position corresponding to the end part of the vehicular hood, the end part fixing device including a pair of capturing members of which the inner configuration substantially corresponds to the outer configuration of a rod secured to the end part of the vehicular hood to define a recess between the pair of capturing members so as to allow the end part of the vehicular hood to be fixed to the main frame by engaging the rod with the recess while the pair of capturing members are deformed elastically, wherein a projecting member is provided for preventing the rod from being introduced into a space defined between the upper capturing member and other member located in the proximity of the upper capturing member.

According to the present invention, since the projecting member occupies the hollow space between the other member (e.g., weather strip) located in the proximity of the upper capturing member of the end part fixing device, the rod can not be displaced toward the hollow space but it is guided into engagement with the recess defined between the pair of capturing members without fail.

Consequently, the rod can be engaged with the end part fixing device merely by thrusting the rod without any particular necessity for concentrating an operator's attention.

Other objects, features and advantages of the present invention will become more readily apparent from a reading of the following description which has been made with reference to the accompanying drawings.

BRIEF DESCRIPTION OF THE DRAWINGS

The present invention will be illustrated in the following drawings in which.

DETAILED DESCRIPTION OF THE PREFERRED EMBODIMENT

Now, the present invention will be described in a greater detail hereinafter with reference to the accompanying drawings which illustrate a preferred embodiment thereof.

Figure 1:
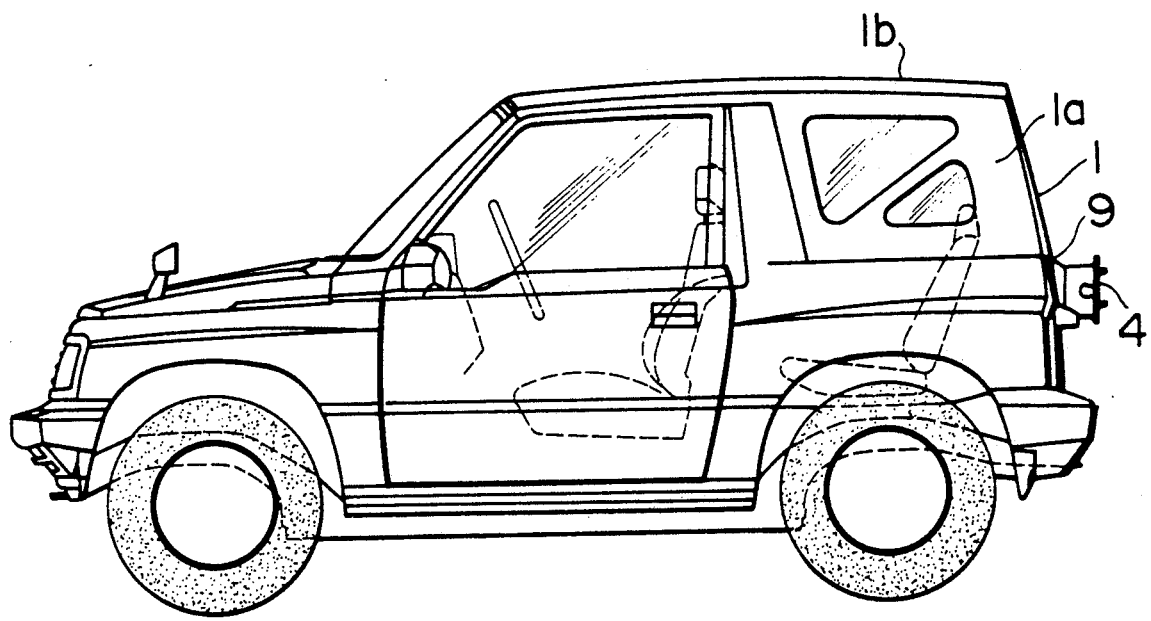
FIG. 1 is a side view illustrating a motorcar of the type having a hood attached thereto for which an end part fixing device in accordance with the present invention is employed.

As shown in FIG. 1, an end part fixing device in accordance with the present invention (not shown) is provided at a position corresponding to the lower end 9 of a rear hood 1 which is fixed to a left side hood 1a, an upper hood 1b and a right side hood (not shown) using a fastener (not shown).

Figure 2:
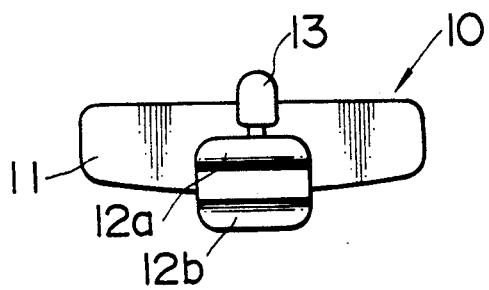
FIG. 2 is a front view illustrating an end part fixing device in accordance with a preferred embodiment of the present invention.
Figure 3:
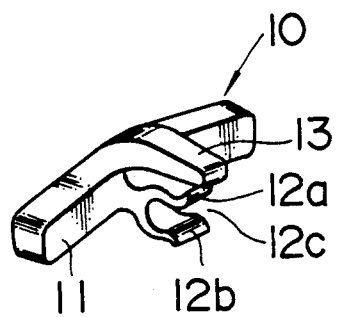
FIG. 3 is a perspective view of the end part fixing device in FIG. 2.
Figure 4:
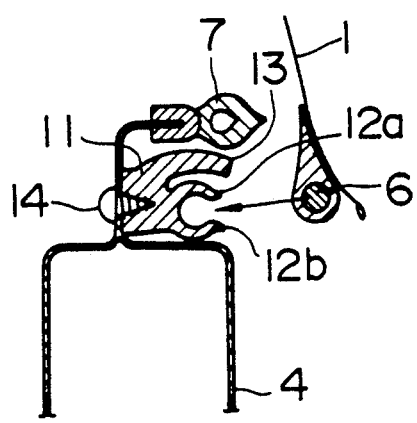
FIG. 4 is a sectional view of the end part fixing device in FIG. 2, particularly illustrating the state that the end part fixing device is fixed to a main frame.
Figure 5:
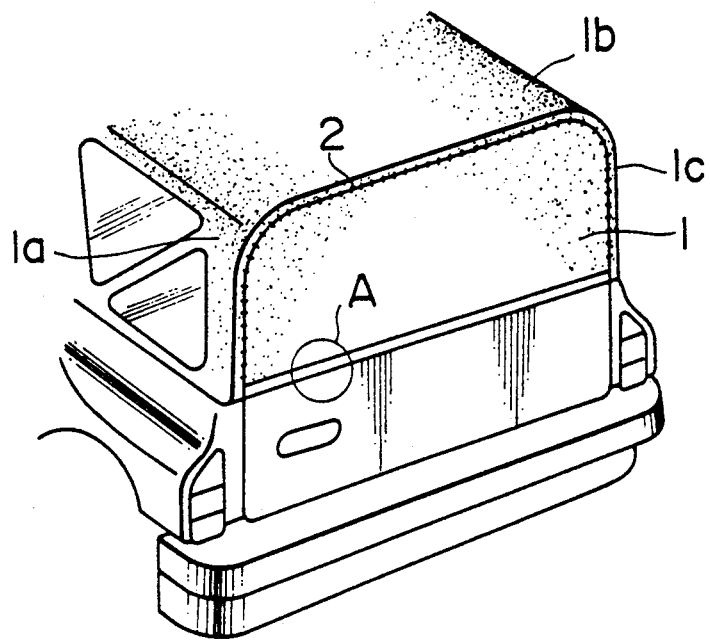
FIG. 5 is a perspective view illustrating the rear part of a motorcar of the type having a hood attached thereto for which a conventional end part fixing device is employed.
Figure 6:
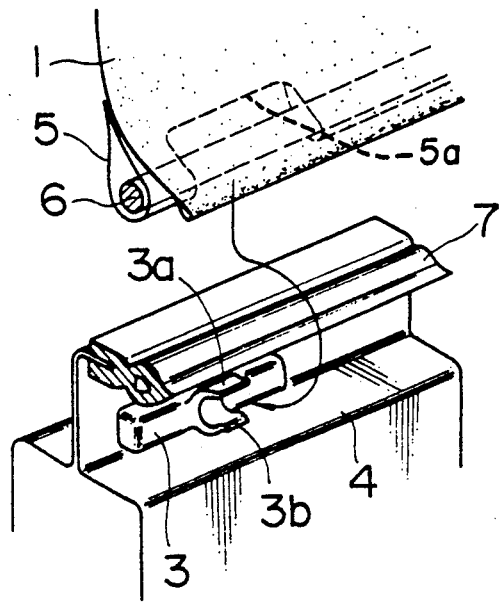
FIG. 6 is a perspective view illustrating the state that the conventional end part fixing device is secured to a main frame.
Figure 7:
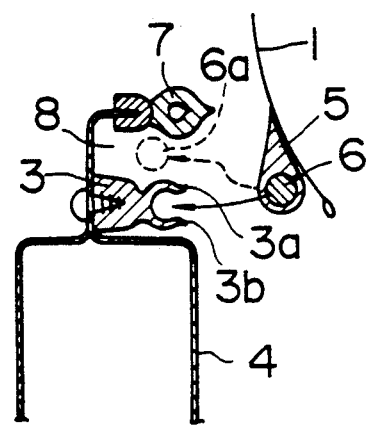
FIG. 7 is a sectional view of the conventional end part fixing device in FIG. 6.

As will be apparent from FIGS. 2 to 4, the end part fixing device 10 of the present invention includes a pair of capturing members 12a and 12b extending toward the rear hood 1 from a bottom portion 11. The pair of capturing members 12a and 12b define a recess 12c of which inner configuration substantially corresponds to the outer configuration of a rod 6. The rear hood 1 is fixed to a main frame via the end part fixing device of the present invention by engaging the rod 6 with the recess 12c while the capturing members 12a and 12b are deformed elastically in the same manner as the conventional end part fixing device.

A projecting member 13 is projected from the bottom portion 11 substantially in parallel with the upper capturing member 12a. When the end part fixing device 10 is secured to the main frame using screws 14, the projecting member 13 is located between the weather strip 7 and the upper capturing member 12a so that incorrect introduction of the rod 6 into a space defined between the weather strip 7 and the upper capturing member 12a is prevented.

Incidentally, since the projecting member 13 is intended to function in the aforementioned manner, it is not necessarily projected from the bottom portion 11. Alternatively, it may be projected from the upper capturing member 12a.

What is claimed is:

1. A vehicular hood fixing arrangement for a flexible hood of a vehicle provided with a groove formed at an upper end of a frame of the vehicle, comprising: a weather strip attached to an upper edge of said frame, adjacent said groove; an upper capturing member and a lower capturing member cooperating to form an end part fixing device mounted to said frame in said groove, said upper capturing member being spaced from said weather strip and defining a gap between said upper capturing member and said weather strip, said capturing members defining a recess therebetween; a rod secured to an end part of the flexible hood, said recess having an inner contour which substantially corresponds to an outer contour of said rod; and, projecting member means, connected to said end part fixing device, said projecting member means being positioned in said gap for preventing said rod from being introduced into said gap, said projecting member means extending from a bottom portion of said end part fixing device to a location beyond a terminating end of said upper capturing member, for guiding said rod, said projecting member means includes a projecting member formed in one piece with said end part fixing device.

2. A vehicular hood fixing arrangement for a vehicle provided with a groove formed at an upper end of a frame of the vehicle, comprising: a weather strip attached to an upper edge of said frame, adjacent said groove; an upper capturing member and a lower capturing member cooperating to form an end part fixing device mounted to said frame in said groove, said upper capturing member being spaced from said weather strip and defining a gap between said upper capturing member and said weather strip, said capturing members defining a recess therebetween; a rod secured to an end part of the vehicular hood, said recess having an inner contour which substantially corresponds to an outer contour of said rod; and a projecting member connected to said end part fixing device and projecting outwardly from a bottom portion of said end part fixing device, said projecting member having a length which is longer than a length of said capturing members for guiding said rod into said recess.

* * * * *